(12) United States Patent
Ueno (10) Patent No.: US 9,811,162 B2
(45) Date of Patent: Nov. 7, 2017

(54) OPERATING DEVICE

(71) Applicant: KABUSHIKI KAISHA TOKAI RIKA DENKI SEISAKUSHO, Aichi (JP)

(72) Inventor: Hiroshi Ueno, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 616 days.

(21) Appl. No.: 14/051,718

(22) Filed: Oct. 11, 2013

(65) Prior Publication Data

US 2014/0104209 A1   Apr. 17, 2014

(30) Foreign Application Priority Data

Oct. 17, 2012  (JP) ................................. 2012-229700

(51) Int. Cl.
*G06F 3/041* (2006.01)
*G06F 3/01* (2006.01)
(Continued)

(52) U.S. Cl.
CPC ............... *G06F 3/016* (2013.01); *H01H 3/12* (2013.01); *H01H 3/42* (2013.01); *H01H 2003/008* (2013.01)

(58) Field of Classification Search
CPC .......... G06F 3/016; G06F 3/047; G06F 3/046; G06F 3/0418; G06F 2203/041;
(Continued)

(56) References Cited

U.S. PATENT DOCUMENTS 5,178,265 A * 1/1993 Sepke ................... H01H 13/58
200/528
7,541,553 B2   6/2009 Meyer
(Continued)

FOREIGN PATENT DOCUMENTS

CN        1657729 A     8/2005
CN      102713805 A    10/2012
(Continued)

OTHER PUBLICATIONS

Office Action issued in corresponding Japanese application No. 2012-229700 on Jan. 8, 2013 (English translation of relevant parts is provided).
(Continued)

*Primary Examiner* — Insa Sadio
(74) *Attorney, Agent, or Firm* — Roberts Mlotkowski Safran Cole & Calderon P.C.

(57) ABSTRACT

An operating device includes a push operation mechanism to be push-operated by an operator, and a drive transmission mechanism to transmit a drive force for presenting the operator with a tactile stimuli-operational feeling via the push operation mechanism. The push operation mechanism is configured to be engageable with the drive transmission mechanism. The drive transmission mechanism is configured to switch between a non-engagement position to allow the push operation of the user without being engaged with the push operation mechanism and an engagement position to allow the transmission of the drive force by being engaged with the push operation mechanism.

9 Claims, 6 Drawing Sheets

(51) Int. Cl.
*H01H 3/12* (2006.01)
*H01H 3/42* (2006.01)
*H01H 3/00* (2006.01)

(58) Field of Classification Search
CPC .. G06F 3/03547; G06F 3/0412; G06F 3/0414; G06F 3/0416; H01H 2003/008; H01H 3/12; H01H 3/42; H01H 345/173; H05K 9/0088; H05K 9/0081; H05K 9/0079; H05K 9/0073
See application file for complete search history.

(56) References Cited

U.S. PATENT DOCUMENTS

| | | | |
|---|---|---|---|
| 2004/0149560 A1* | 8/2004 | Sasaki | H01H 13/585 200/520 |
| 2005/0183940 A1 | 8/2005 | Ichimaru | |
| 2005/0252759 A1 | 11/2005 | Ichimaru | |
| 2011/0141052 A1* | 6/2011 | Bernstein | G06F 3/016 345/174 |

FOREIGN PATENT DOCUMENTS

| | | |
|---|---|---|
| JP | 07-244558 A | 9/1995 |
| JP | 2002-297314 | 10/2002 |
| JP | 2005-263317 | 9/2005 |
| JP | 2010-204741 | 9/2010 |

OTHER PUBLICATIONS

Extended European Search Report issued in corresponding EP application 13187867.0 dated Dec. 3, 2014.
Chinese Office Action for application No. 201310470365.6 dated Feb. 29, 2016 and English translation.
Office Action issued in the corresponding Chinese application No. 201310470365.6 dated Mar. 9, 2017.
Office Action issued in corresponding Chinese Application No. 201310470365.6 dated Aug. 17, 2017 with English tanslation.

* cited by examiner

FIG.1

20 TOUCH PANEL DEVICE  23 TOUCH SENSOR SUBSTRATE
30 PUSH OPERATION MECHANISM  40 TACTILE DISPLAY DEVICE
41 DRIVE TRANSMISSION MECHANISM

OPERATING DEVICE

The present application is based on Japanese patent application No. 2012-229700 filed on Oct. 17, 2012, the entire contents of which are incorporated herein by reference.

BACKGROUND OF THE INVENTION

1. Field of the Invention

The invention relates to an operating device and, in particular, to an operating device with a function of presenting tactile stimuli-operational feeling to an operator.

2. Description of the Related Art

A direction indicating device for indicating a direction using, e.g., a tilt of a finger of an operator has been proposed as an example of a conventional information presentation device for transmitting information to an operator (see, e.g., JP-A-2010-204741).

The conventional direction indicating device described in JP-A-2010-204741 is configured such that a finger placing plate arranged on upper surfaces of plural movable panels which are independently vertically movable is inclined corresponding to a traveling direction displayed on a screen of a car navigation device. As an example of a movable portion for driving the movable panels, racks formed to protrude downward from the movable panels and a pinion fixed to an output shaft of a stepper motor are used.

SUMMARY OF THE INVENTION

In the conventional information presentation device, it may be desired to use a structure which allows an operational feeling similar to a click feeling of an input device to be obtained by an input operation of a touch panel. However, the conventional direction indicating device described in JP-A-2010-204741 is arranged in a state that the pinion of the stepper motor is always engaged with and coupled to the racks of the movable panels. Therefore, there is a problem that this engagement between the racks of the movable panels and the pinion of the stepper motor act as a resisting force against the input operation of the movable panels and impairs the operational feeling of the movable panels.

It is an object of the invention to provide an operating device that can achieve both an operation function and a tactile display function.

(1) According to one embodiment of the invention, an operating device comprises:

a push operation mechanism to be push-operated by an operator; and a drive transmission mechanism to transmit a drive force for presenting the operator with a tactile stimuli-operational feeling via the push operation mechanism, wherein the push operation mechanism is configured to be engageable with the drive transmission mechanism, and wherein the drive transmission mechanism is configured to switch between a non-engagement position to allow the push operation of the user without being engaged with the push operation mechanism and an engagement position to allow the transmission of the drive force by being engaged with the push operation mechanism.

In the above embodiment (1) of the invention, the following modifications and changes can be made.

(i) The push operation mechanism comprises a linking member supported so as to be rotatable in conjunction with a push operation of the push operation mechanism, and wherein the drive transmission mechanism comprises a cam mechanism to switch between an engagement and a non-engagement with the linking member.

(ii) The cam mechanism comprises a rotating cam member rotated by drive of a rotary drive means, and wherein the linking member comprises a cam follower surface to contact with a cam surface of the rotating cam member in accordance with rotation of the rotating cam member.

(iii) The linking member comprises a coupling pin that is coupled to a coupling member provided on the push operation mechanism.

(iv) The operating device further comprises a stopper that defines a stop position of the cam mechanism.

(v) The stopper is comprised of the linking member.

(vi) The rotating cam member comprises a first cam surface and a second cam surface that are formed symmetrical with respect to an output shaft of the rotatory drive means, wherein the first cam surface contacts with the linking member to allow the push operation when the drive transmission mechanism is not engaged with the linking member, and wherein the second cam surface engages with the linking member to rotate in accordance with rotation of the rotary drive means when the drive transmission mechanism is engaged with the linking member.

(vii) The operating device further comprising a stopper to define a stop position of the rotating cam member, wherein rotating cam member comprises a first cam surface and a second cam member formed opposite the first cam surface, wherein the first cam surface contacts with the stopper to allow the push operation when the drive transmission mechanism is not engaged with the linking member, and wherein the second cam surface engages with the linking member to rotate in accordance with rotation of the rotary drive means when the drive transmission mechanism is engaged with the linking member.

(viii) The push operation mechanism comprises a touch panel to be operated by the operator and a stabilizer to suppress a tilting operation of the touch panel during the push operation.

(ix) The push operation mechanism further comprises a linking member supported so as to be rotatable in conjunction with a push operation of the push operation mechanism, and wherein the stabilizer is attached so as to cross with a rotation shaft of the linking member.

EFFECTS OF THE INVENTION

According to one embodiment of the invention, an operating unit can be provided that satisfies both a good operational feeling and a good haptic feeling.

BRIEF DESCRIPTION OF THE DRAWINGS

Next, the present invention will be explained in more detail in conjunction with appended drawings, wherein.

DESCRIPTION OF THE PREFERRED EMBODIMENTS

A preferred embodiment of the invention will be specifically described below in conjunction with the appended drawings.

Overall Structure of Operating Device

Figure 1:
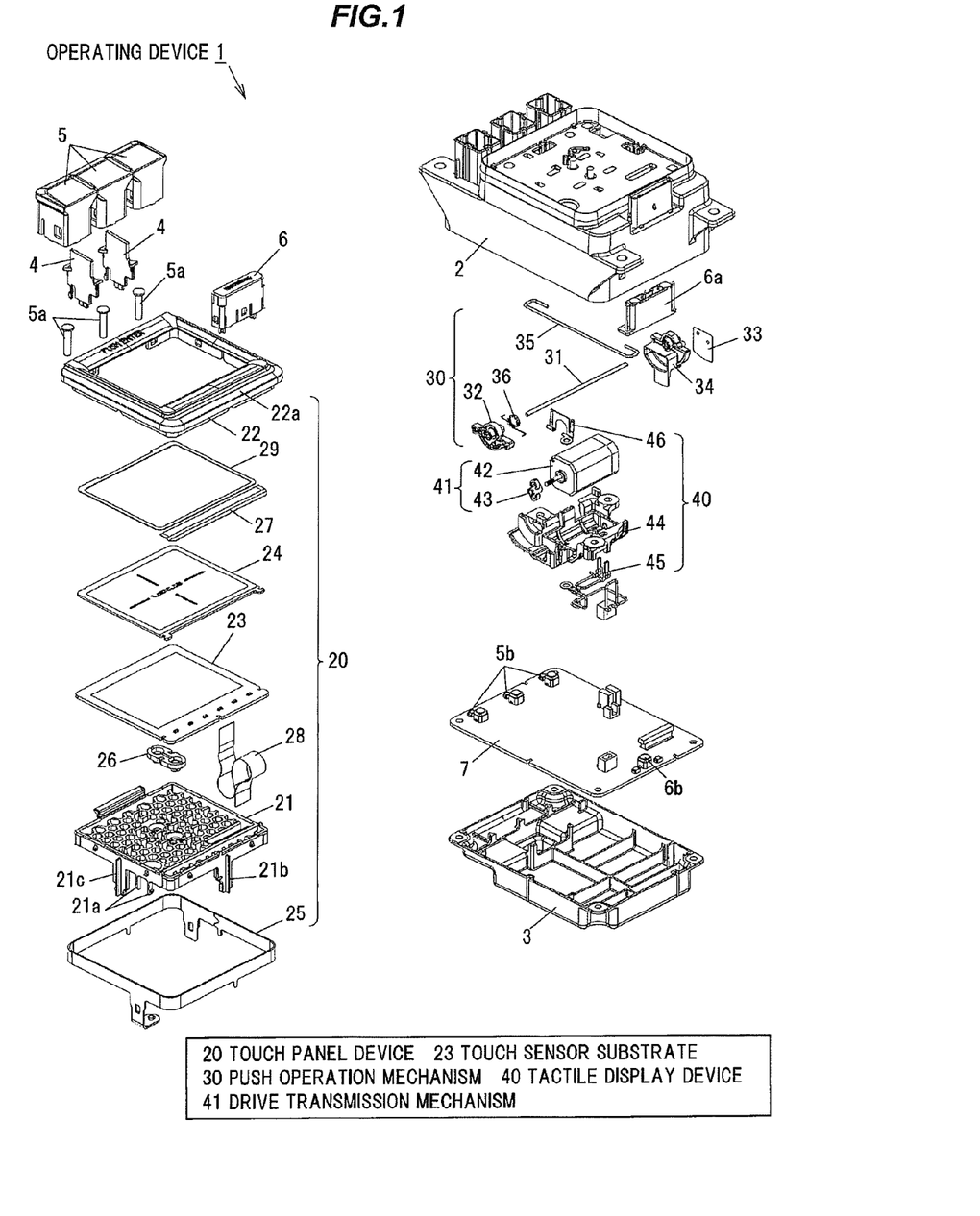
FIG. 1 is a schematic exploded perspective view showing a typical operating device provided with a tactile display device in an embodiment of the present invention.
Figure 2A:
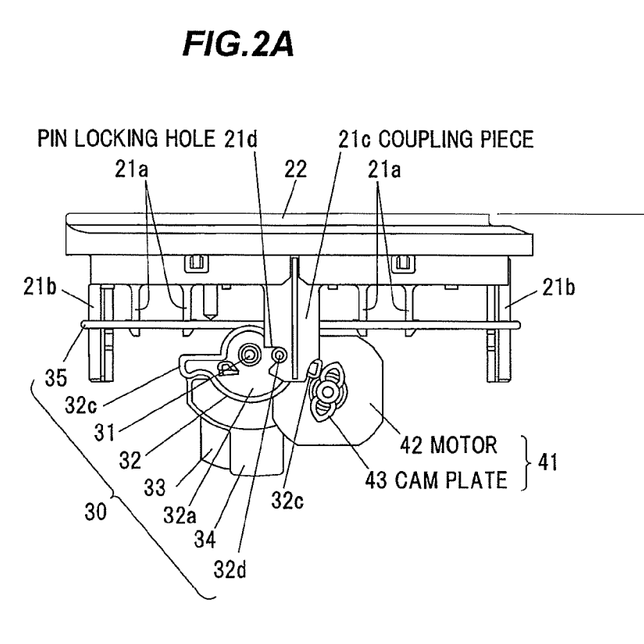
FIGS. 2A and 2B are explanatory diagrams illustrating an operation of the tactile display device during a push operation.
Figure 2B:
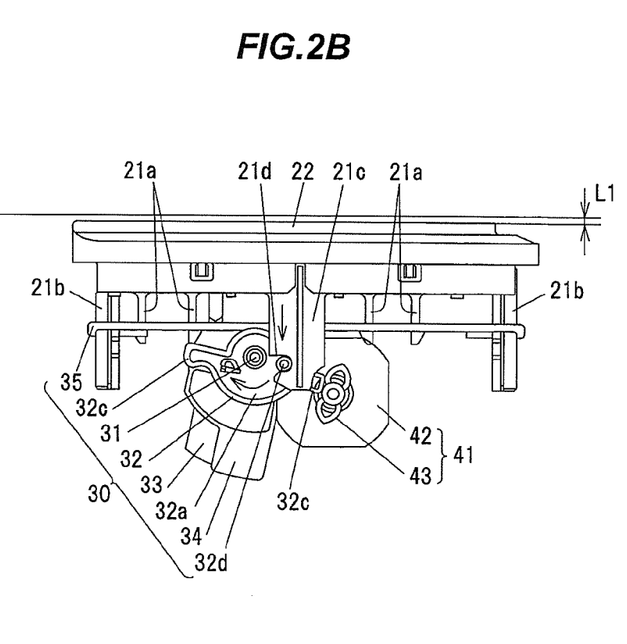
Figure 3A:
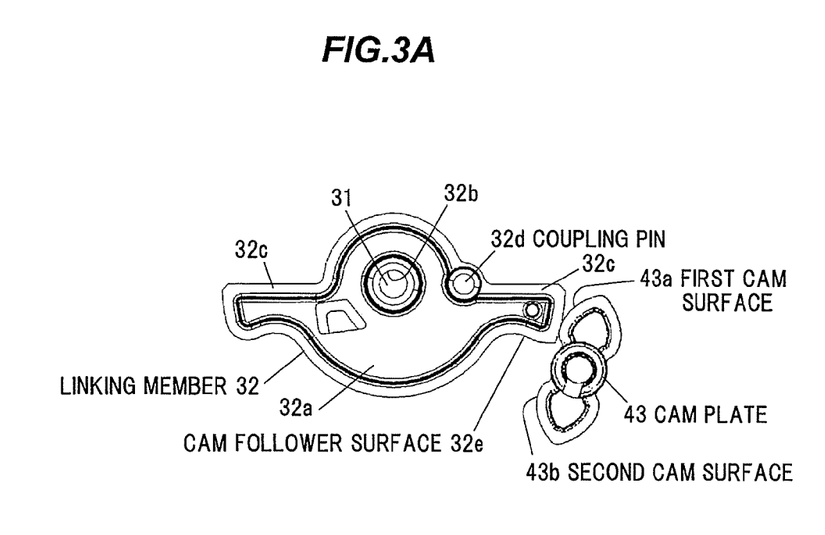
FIGS. 3A and 3B are diagrams corresponding to FIGS. 2A and 2B to show an operation of components of the tactile display device.
Figure 3B:
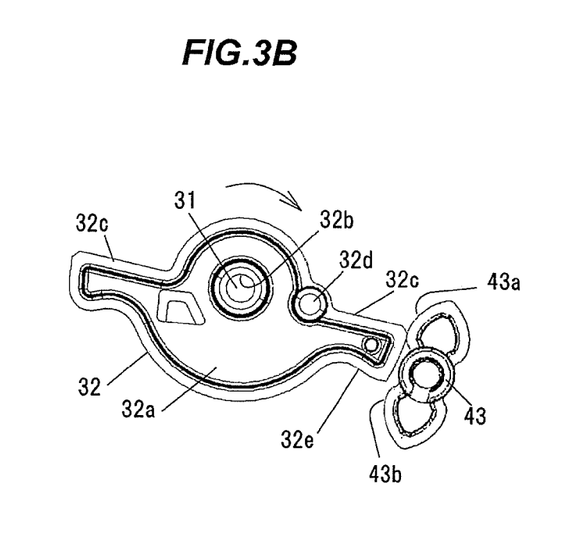
Figures 4A, 4B:
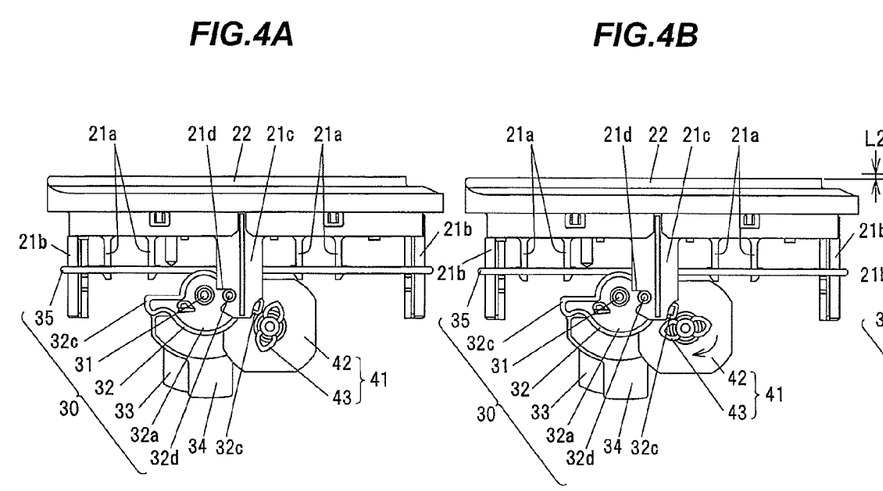
FIGS. 4A to 4C are explanatory diagrams illustrating an operation of the tactile display device during vibration feedback.
Figure 4C:
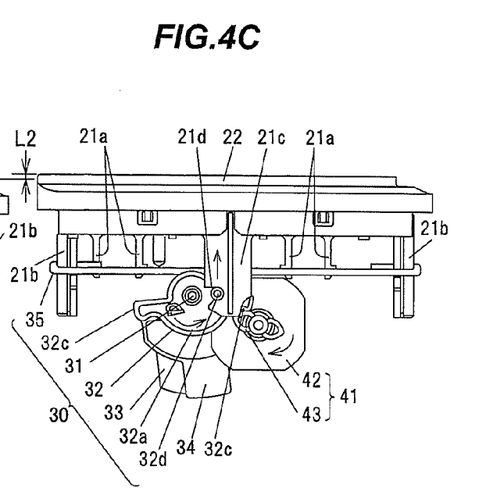
Figure 5A:
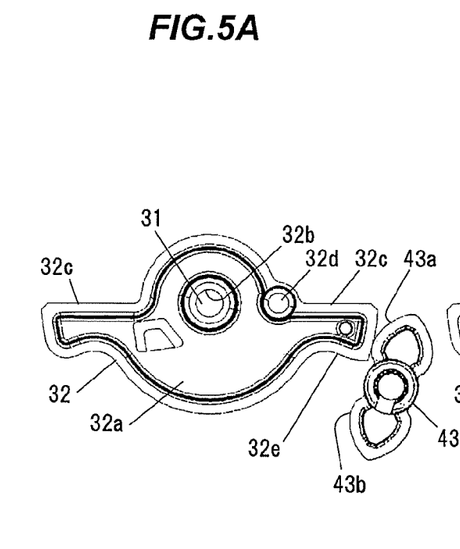
FIGS. 5A to 5C are diagrams corresponding to FIGS. 4A to 4C to show an operation of components of the tactile display device.
Figure 5B:
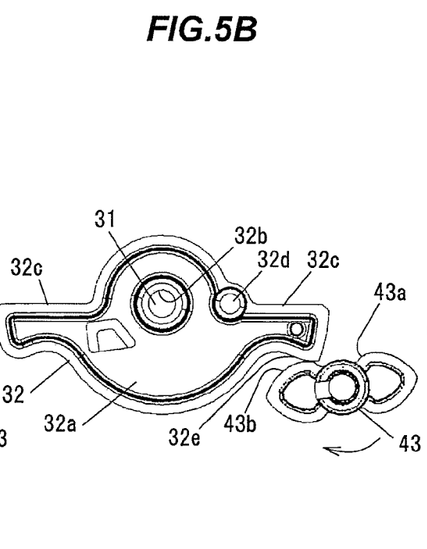
Figure 5C:
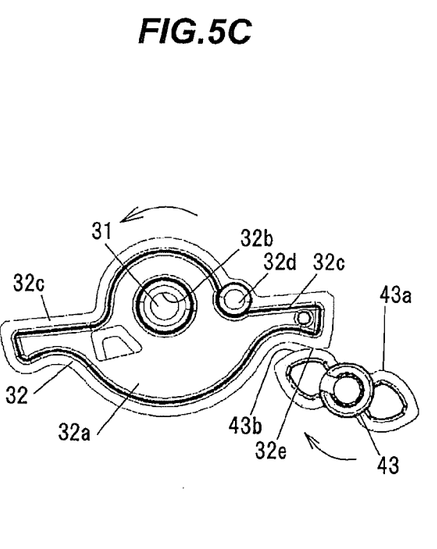

In FIG. 1, a typical operating device provided with a tactile display device in the embodiment is indicated generally by the reference numeral 1 and components of the operating device are schematically shown as an example. The operating device 1 is not specifically limited but is suitably used as a vehicle touch panel which outputs operation signals for controlling operation of an on-vehicle equipment, e.g., an air-conditioning system, an audio system or a navigation system, etc.

The operating device 1 in the illustrated example is arranged on a periphery of a driver's seat such as a center console (not shown) in a vehicle and is connected to a display (not shown) via a wiring.

The operating device 1 is configured as a remote control input device in which a touch operation of a touch panel by a finger of an operator causes, e.g., a touch sensor to detect a touch position on a surface of the touch panel and outputs a position detection signal corresponding to the detected position to select and determine an item button on a display.

As shown in FIG. 1, the operating device 1 is provided with a touch panel device 20 which can be push-operated and a tactile display device 40 which presents tactile stimuli-operational feeling (haptic feeling) to a finger of an operator when the touch panel device 20 is operated and receives an input.

Respective components of the touch panel device 20 and the tactile display device 40 are fitted into a resin body 2 formed in a case shape which opens downward, as shown in FIG. 1. A resin cover body 3 covering the lower opening of the body 2 is fastened and fixed by screws (not shown), thereby forming the operating device 1 in which the touch panel device 20 and the tactile display device 40 are integrated.

As shown in FIG. 1, three (first to third) operating knobs 5, 5, 5 are provided in line on one side of the body 2. Resin separators 4, 4 as insulations are interposed between adjacent operating knobs 5. A fourth operating knob 6 is provided on another side of the body 2. The first to fourth operating knobs 5 and 6 are arranged so that push switches 5b and 6b mounted on a control board 7 can be respectively turned on and off via pushers 5a and 6a.

Structure of Touch Panel Device

As shown in FIG. 1, the touch panel device 20 is assembled in a state that a rectangular touch sensor substrate 23 is attached to a sheet-like touch panel 24 by a double-sided tape (not shown) between a base 21 having a rectangular shape in a plan view and a frame 22 having a frame shape. The base 21 and the frame 22 are formed of a resin material. A rectangular frame-shaped sealing member 25 is arranged so as to cover an outer periphery of the touch panel device 20. The sealing member 25 is electrically connected to a ground circuit of the control board 7.

A recessed portion having a recessed shape is formed on an upper surface of the base 21 and the touch sensor substrate 23 is elastically held on a bottom surface of the recessed portion via a click member 26, as shown in FIG. 1. The click member 26 is formed of a cylindrical rubber material displaceable with respect to the touch panel 24 due to elastic deformation, and is formed so that an inner diameter on the touch panel 24 side is larger than that on the base 21 side.

The frame 22 is formed of a frame portion 22a providing an opening on the upper surface, as shown in FIG. 1. The frame portion 22a has a plate frame having a picture frame shape and a cylindrical wall portion extending from an edge of the inner periphery of the plate frame toward a housing portion.

As shown in FIG. 1, the touch sensor substrate 23 is connected to the touch panel 24 via a conductive tape 27 as an electrically conductive material.

As shown in FIG. 1, the touch sensor substrate 23 is, e.g., a capacitive touch sensor for detecting capacitance and is connected, via a flexible flat cable 28, to a connector (not shown) mounted on the control board 7. Meanwhile, the touch panel 24 is attached to the back side of the plate frame of the frame 22 by a double-sided tape 29 having sealing properties and is operably arranged such that an operation surface is exposed in an opening of the frame portion 22a of the frame 22.

Furthermore, as shown in FIG. 1, plural elastic engaging pieces 21a ... 21a to be engaged with through-holes formed on the body 2, a pair of guide pieces 21b, 21b guiding and moving along guide holes formed on the body 2 and a coupling piece 21c as a coupling member moving in conjunction with reciprocating movement of the touch panel 24 are formed on the base 21 so as to respectively extend toward a push operation mechanism 30.

Structure of Push Operation Mechanism

As shown in FIG. 1, the push operation mechanism 30 is provided with a support shaft 31 rotatably fixed to the body 2 and a linking member 32 which rotates integrally with one end of the support shaft 31. A disc encoder 33 as a location sensor for detecting a position of the push operation mechanism 30 and a holder 34 for holding the disc encoder 33 are fixed to another end of the support shaft 31.

The push operation mechanism 30 is further provided with a stabilizer 35 for suppressing a tilting operation of the touch panel 24 during the push operation, as shown in FIG. 1. The stabilizer 35 is attached to the pair of guide pieces 21b of the touch panel device 20 at both ends respectively so as to cross with the support shaft 31, thereby suppressing the tilting operation around the support shaft 31.

A torsion spring 36 is attached to the linking member 32, as shown in FIG. 1. The torsion spring 36 is configured to constantly bias the linking member 32 in one direction. The support shaft 31 and the torsion spring 36 are formed of a metal material and the linking member 32 is formed of a resin material.

As shown in FIGS. 2A to 3B, the linking member 32 has a doughnut-shaped basal portion 32a having a support shaft-insertion hole 32b and a pair of arm portions 32c, 32c which are formed on both sides so as to protrude from an outer peripheral surface of the basal portion 32a. A coupling pin 32d protrudes from the basal portion 32a at an eccentric position.

The coupling pin 32d of the linking member 32 is coupled to the coupling piece 21c so as to be reciprocable (capable of reciprocating micro-motion) in a pin locking hole 21d formed on the coupling piece 21c of the base 21 of the touch panel device 20, as shown in FIGS. 2A to 3B. Due to the coupling between the coupling pin 32d and the coupling piece 21c, the linking member 32 rotates forward and backward around the support shaft 31 of the push operation mechanism 30 in conjunction with the push operation of the touch panel device 20. A portion of the coupling piece 21c opposite to the pin locking hole 21d is notched so as not to interfere with the tactile display device 40.

Structure of Tactile Display Device

The main basic structure of the operating device 1 in the present embodiment is the tactile display device 40 which provides both an operational feeling and a haptic feeling. Therefore, the operating device 1 configured as described above is only a configuration example in the present embodiment, and shapes and structures of the components thereof are not limited to those of the illustrated example.

The tactile display device 40 is provided with a tactile display means for presenting tactile stimuli-operational feeling to a finger of an operator via the push operation mechanism 30. As shown in FIG. 1, the tactile display means is composed mainly of the linking member 32 of the push operation mechanism 30 and a drive transmission mechanism 41. The drive transmission mechanism 41 is provided with a rotary drive means and a cam mechanism.

As shown in FIG. 1, a motor 42 as the rotary drive means which can rotate forward and backward is held in a housing 44 which is fastened and fixed to the body 2 by screws (not shown). The motor 42 is electrically connected to the control board 7 via a terminal 45 having a cord electrically connected to the control board 7 and also via a ground clip 46 for discharging static electricity built up in the motor 42 to the ground circuit of the control board 7.

Meanwhile, as shown in FIG. 1, the cam mechanism is provided with a cam plate 43 as a rotating cam member which is fixed to an output shaft of the motor 42.

If the push operation mechanism 30 is continuously engaged with the tactile display device 40, the linking member 32 of the push operation mechanism 30 and the cam plate 43 of the tactile display device 40 will act as a resisting force against the push operation of the push operation mechanism 30 so as to impair the operation feeling thereof. Therefore, the continuous engagement is not preferred.

In the illustrated example, a structure to release the engagement between the linking member 32 and the cam plate 43 is provided. As shown in FIGS. 4A to 5C, the cam plate 43 is configured to be rotatable between an engagement position to transmit a drive force for presenting the operator with the tactile stimuli-operational feeling to the linking member 32 by allowing the cam plate 43 engage with the linking member 32 and a non-engagement position to allow the push operation of the user without having the cam plate 43 engage with the linking member 32. When it is not necessary to generate a haptic feeling, the tactile display device 40 is stopped at a position away from the push operation mechanism 30.

As shown in FIGS. 4A to 5C, the cam plate 43 is a motion converting member which converts the oscillating rotary motion of the motor 42 into the reciprocating micro-motion of the touch panel device 20. On an outer surface of the cam plate 43, a first cam surface 43a and a second cam surface 43b are formed so as to be symmetrical with respect to the output shaft of the motor 42. In the illustrated example, each of the first cam surface 43a and the second cam surface 43b is formed to have an involute curve.

The first cam surface 43a serves as a stopper surface which abuts against the arm portion 32c of the linking member 32 on a cam plate-facing side to stop rotation of the motor 42, as shown in FIGS. 2A to 3B. The arm portion 32c is configured as a stopper which defines a stop position of the cam plate 43. On the other hand, the second cam surface 43b is configured to rotate at a predetermined angle while abutting against the linking member 32 at a cam follower surface 32e of the arm portion 32c on the cam plate-facing side, as shown in FIGS. 4A to 5C.

Operation of Tactile Display Device

Next, an operation of the tactile display device 40 configured as described above will be described.

When the arm portion 32c of the linking member 32 of the push operation mechanism 30 abuts against the first cam surface 43a of the cam plate 43 of the drive transmission mechanism 41, the cam plate 43 (or the drive transmission mechanism 41) is at the non-engagement position not to transmit the drive force from the motor 42 to the push operation mechanism 30, and the push operation of the touch panel device 20 is allowed.

The push operation of the touch panel device 20 causes the coupling pin 32d of the linking member 32 to be pressed via the pin locking hole 21d of the coupling piece 21c of the touch panel device 20. This rotates the linking member 32 around the support shaft 31 in a direction indicated by an arrow in FIGS. 2A to 3B. The touch panel device 20 moves with an operation stroke L1 but the cam plate 43 does not rotate since the linking member 32 moves without contacting the cam plate 43.

Therefore, even when the arm portion 32c of the linking member 32 is engaged with the first cam surface 43a of the cam plate 43, the push-operation mode is maintained despite the rotation of the linking member 32 as long as the arm portion 32c contacts the first cam surface 43a since each of the arm portion 32c and the first cam surface 43a has a curved surface.

On the other hand, rotation of the second cam surface 43b of the cam plate 43 at a predetermined angle while abutting against the arm portion 32c of the linking member 32 causes the linking member 32 to rotate around the support shaft 31 in a direction indicated by an arrow in FIGS. 4A to 5C. This causes the coupling piece 21c of the touch panel device 20 to be pressed via the coupling pin 32d of the linking member 32 and the touch panel device 20 thus moves with an operation stroke L2.

When the cam follower surface 32e of the linking member 32 contacts and rides over the second cam surface 43b of the cam plate 43, the cam plate (or the drive transmission mechanism 41) is at the engagement position to transmit the drive force from the motor 42 to the push operation mechanism 30, which is in a tactile display mode for presenting tactile sensation to the touch panel device 20.

This allows reciprocating micro-motion of the coupling piece 21c of the touch panel device 20 via the coupling pin 32d of the linking member 32 with a varying pattern corresponding to the shape of the second cam surface 43b of the cam plate 43. Due to rotation of the cam plate 43 of the tactile display device 40 while abutting against the arm portion 32c of the push operation mechanism 30, the forward and backward rotational force of the motor 42 is transmitted to the linking member 32 of the push operation mechanism 30.

Then, the forward and backward rotational force of the linking member 32 causes reciprocating micro-motion of the coupling piece 21c of the touch panel device 20, which vibrates the touch panel 24. Due to the vibration of the touch panel 24, feedback as tactile information in a vertical direction is given to the finger of the operator.

According to a touch signal, from the touch panel device 20, indicating that the operation is performed by the finger of the operator, a control signal to repeat clockwise and counterclockwise rotations is output to the motor 42 and the motor 42 is rotationally driven in forward and backward rotational directions at a predetermined angle of rotation and a predetermined repetition cycle, and the tactile information is thereby obtained.

Effects of the Embodiment

Use of the operating device 1 configured as described above provides the following effects in addition to the above-mentioned effects.

(1) It is possible to effectively obtain a configuration that allows a haptic feeling to be generated only in a necessary direction when tactile feedback is needed.

(2) It is possible to reduce a resisting force against the push operation of the push operation mechanism 30 and a good operational feeling is thus obtained.

(3) It is possible to reduce cogging torque of the motor 42 and it is thus possible to realize drive with less impact noise and vibration, etc., associated with the cogging torque.

(4) It is not necessary to provide a special mechanism to release the coupling between the linking member 32 of the push operation mechanism 30 and the cam plate 43 of the drive transmission mechanism 41. Therefore, it is possible to avoid an increase in size and complexity of the entire operating device.

(5) Since the first cam surface 43a and the second cam surface 43b are symmetrical, an attaching direction of the cam plate 43 is not specified and it is thus possible to improve assembly properties.

Modification

Although a typical configuration example of the operating device 1 of the invention has been described above in reference to the embodiment and the illustrated example, the following modification can be also implemented.

Figure 6A:
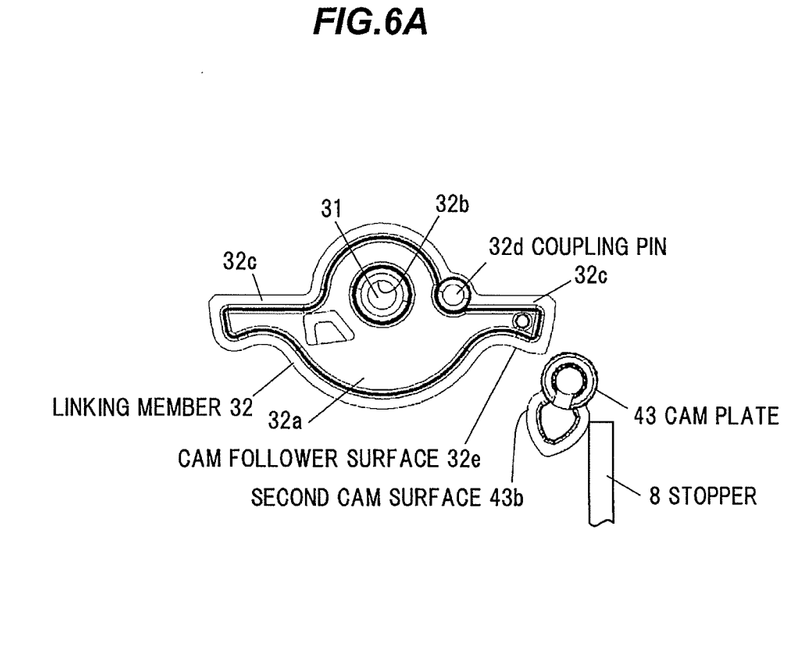
FIGS. 6A and 6B are explanatory diagrams illustrating a modification of the tactile display device.
Figure 6B:
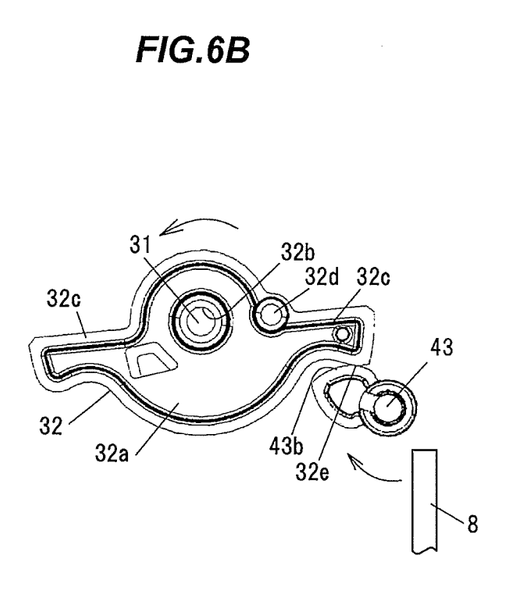

In FIGS. 6A and 6B, a modification of the tactile display device 40 is shown as an example. While the cam plate 43 of two-cam type having a pair of cams on both sides is provided in the embodiment, the modification is different from the embodiment in that the cam plate 43 of single-cam type having a cam only on one side is provided. It should be noted that substantially the same members as those in the embodiment are denoted by the same names and the same reference numerals in FIGS. 6A and 6B. Therefore, the detailed description thereof will be omitted.

In FIGS. 6A and 6B, the first cam surface 43a is eliminated and only the second cam surface 43b is formed on the outer surface of the cam plate 43 of single-cam type. The second cam surface 43b is configured to rotate at a predetermined angle while abutting against the cam follower surface 32e of the linking member 32. A surface opposite to the second cam surface 43b serves as a stopper surface for stopping rotation of the motor 42 by abutting against a stopper 8 which defines the stop position of the drive transmission mechanism 41.

The stopper 8 is a member provided to serve one of the functions of the linking member 32 in the embodiment and is fixed to, e.g., the body 2, the control board 7, the motor 42 or housing 44. The shape, etc., of the stopper 8 can be appropriately determined depending on the layout position. A material suitable for the stopper 8 is, e.g., a rubber material such as silicon rubber.

In the tactile display device 40 of the modification configured as described above, interference with the arm portion 32c of the linking member 32 when the cam plate 43 rotates can be effectively prevented by a simple structure.

Other Modifications

In the operating device 1 of the invention, the following other modifications can be also implemented.

(1) It is obvious that the above-mentioned tactile display means is applicable not only to on-vehicle equipments but also to various terminal units, e.g., game consoles, personal computers and mobile phones, etc.

(2) It is possible to present tactile stimuli-operational feeling to a finger of an operator even in various switching devices not provided with a touch panel and the above-mentioned tactile display means is also applicable to, e.g., mouse devices, keyboards and control knobs, etc.

(3) The number, position and arrangement of the above-mentioned tactile display means can be appropriately selected depending on, e.g., the intended use, etc., to achieve the initial object of the invention.

Although a typical embodiment, a modification and an illustrated example of the invention have been described, the invention according to claims is not to be limited to the embodiment, modification and illustrated example, as obvious from the above description. Therefore, it should be noted that all combinations of the features described in the embodiment, modification and illustrated example are not necessary to solve the problem of the invention.

What is claimed is:

1. An operating device, comprising:
   a push operation mechanism including a touch panel to be push-operated by an operator applying a pushing force along a push operation direction; and
   a drive transmission mechanism including an electrically powered rotary drive means that generates and transmits a drive force for presenting the operator with a tactile stimuli-operational feeling via the push operation mechanism,
   wherein the push operation mechanism is configured to be engageable with the drive transmission mechanism,
   wherein the drive transmission mechanism is configured to switch between a non-engagement position to allow the push operation of the user without being engaged with the push operation mechanism and an engagement position to allow the transmission of the drive force by being engaged with the push operation mechanism,
   wherein the switching operation of the drive transmission mechanism is powered by the operation of the electrically powered rotary drive means and not by the pushing force applied to the push operation mechanism,
   wherein the drive transmission mechanism comprises a cam mechanism that rotates about an axis that is orthogonal to the push operation direction to switch between engagement with and non-engagement with the push operation mechanism, and
   wherein the push operation mechanism further includes a stabilizer to suppress tilting of the touch panel during the push operation.

2. The operating device according to claim 1, wherein the push operation mechanism comprises a linking member supported so as to be rotatable in conjunction with a push operation of the push operation mechanism, and wherein the drive transmission mechanism comprises a cam mechanism to switch between an engagement and a non-engagement with the linking member.

3. The operating device according to claim 2, wherein the cam mechanism comprises a rotating cam member rotated about an axis that is orthogonal to the push operation direction by the rotary drive means, and wherein the linking member comprises a cam follower surface to contact with a cam surface of the rotating cam member in accordance with rotation of the rotating cam member.

4. The operating device according to claim 3, wherein the rotating cam member comprises a first cam surface and a second cam surface that are formed symmetrical with respect to an output shaft of the rotary drive means, wherein the first cam surface contacts with the linking member to allow the push operation when the drive transmission mechanism is not engaged with the linking member, and wherein the second cam surface engages with the linking member to rotate in accordance with rotation of the rotary drive means when the drive transmission mechanism is engaged with the linking member.

5. The operating device according to claim 3, further comprising a stopper to define a stop position of the rotating cam member, wherein rotating cam member comprises a first cam surface and a second cam member formed opposite the first cam surface, wherein the first cam surface contacts with the stopper to allow the push operation when the drive transmission mechanism is not engaged with the linking member, and wherein the second cam surface engages with the linking member to rotate in accordance with rotation of the rotary drive means when the drive transmission mechanism is engaged with the linking member.

6. The operating device according to claim 2, wherein the linking member comprises a coupling pin that is coupled to a coupling member provided on the push operation mechanism.

7. The operating device according to claim 2, further comprising a stopper that defines a stop position of the cam mechanism.

8. The operating device according to claim 7, wherein the stopper is comprised of the linking member.

9. The operating device according to claim 1, wherein the push operation mechanism further comprises a linking member supported so as to be rotatable in conjunction with a push operation of the push operation mechanism, and wherein the stabilizer is attached so as to cross with a rotation shaft of the linking member.

* * * * *